June 29, 1971  R. L. BANKS  3,590,098

CONVERSION OF MIXED BUTENES TO ISOAMYLENES

Filed April 18, 1968

INVENTOR.
R. L. BANKS

BY *Young & Quigg*

ATTORNEYS

United States Patent Office 3,590,098
Patented June 29, 1971

3,590,098
**CONVERSION OF MIXED BUTENES
TO ISOAMYLENES**
Robert L. Banks, Bartlesville, Okla., assignor to
Phillips Petroleum Company
Filed Apr. 18, 1968, Ser. No. 722,264
Int. Cl. C07c 3/62
U.S. Cl. 260—683D 9 Claims

ABSTRACT OF THE DISCLOSURE

Isoamylene is produced from a stream comprising normal and isobutene by reacting the mixed butenes in an olefin reaction zone in the presence of ethylene followed by reacting resulting isobutene and propylene in a second olefin reaction zone.

This invention relates to the production of isoamylene from mixed butenes. In one aspect it relates to a process for the production of isoamylenes from mixed butenes utilizing the olefin reaction and separation steps.

In many instances it is desirable to convert a linear acyclic olefin hydrocarbon to produce a branched acyclic olefin hydrocarbon. For example, isoamylene, which is a valuable intermediate for the production of isoprene, it is a desirable product to produce from a relatively inexpensive and readily available feed stock such as mixed butenes.

An object of the invention is to produce isoamylene from mixed butenes. Another object of the invention is to produce relatively high purity isoamylenes. Another object of the invention is to efficiently convert mixed butenes into isoamylenes with relatively small amounts of by-products.

According to the invention mixed butenes are converted in a first olefin reaction zone in the presence of ethylene to produce propylene and the resulting propylene and isobutylene are converted in a second olefin reaction zone to produce isoamylene.

The present invention provides a novel process for the production of isoamylenes from a mixed butene feed stock. A feature of the invention is that the ethylene by-product, which might ordinarily be rejected from the process, is used in an olefin reaction step wherein a substantial amount, if not all, of the n-butenes are converted to propylene. The newly formed propylene is then used to convert the isobutene to isoamylenes having a purity approaching 100 percent. Relatively small amounts of heavier by-products are formed.

The term "olefin reaction" as used herein is defined as a process for the catalytic conversion over a catalyst of a feed comprising one or more ethylenically unsaturated compounds to produce a resulting product which contains at least 10 percent by weight of product compounds, which product compounds can be visualized as resulting from at least one primary reaction, as defined below, or the combination of at least one primary reaction and at least one unsaturated bond isomerization reaction, and wherein the sum of the compounds contained in said resulting product consisting of hydrogen, saturated compounds, and compounds which can be visualized as formed by skeletal isomerization but which cannot be visualized as formed by one or more of the above-noted reactions, comprises less than 25 percent by weight of the total of said resulting product. Feed components and unsaturated bond isomers thereof are not included in the resulting product for the purpose of determining the above-noted percentages.

In the olefin reaction, as defined above, the primary reaction is a reaction which can be visualized as comprising the breaking of two existing unsaturated bonds between first and second carbon atoms and between third and fourth carbon atoms, respectively, and the formation of two new unsaturated bonds between said first and third and between said second and fourth carbon atoms. Said first and second carbon atoms and said third and fourth carbon atoms can be in the same or in different molecules.

The olefin reaction as used in the present invention is illustrated by the following reactions:

(1) The disproportionation of an acyclic mono- or polyene having at least 3 carbon atoms into other acyclic mono- or polyenes or both higher and lower number of carbon atoms; for example, the disproportionation of propylene yields ethylene and butenes; the disproportionation of 1,5-hexadiene yields ethylene and 1,5,9-decatriene;

(2) The conversion of an acyclic mono- or polyene having 3 or more carbon atoms with a different acyclic mono- or polyene having 3 or more carbon atoms to produce different acyclic olefins; for example, the conversion of propylene and isobutylene yields ethylene and isopentene; and (3) The conversion of ethylene and an internal acyclic mono- or polyene having 4 or more carbon atoms to produce other olefins having a lower number of carbon atoms than that of the acyclic mono- or polyenes; for example, the conversion of ethylene and 4-methylpentene-2 yields propylene and 2-methylbutene-1.

The catalysts which are applicable in the present invention include all of those which have activity for the disproportionation of propylene to ethylene and butene. Some examples of such catalysts are:

(1) Silica or thoria promoted by an oxide or a compound convertible to the oxide by calcination of tungsten, molybdenum, rhenium or tellurium or by a sulfide of tungsten or molybdenum;

(2) Alumina promoted by an oxide or compound convertible to an oxide by calcination of molybdenum, tungsten, or rhenium; by a sulfide of tungsten or molybdenum; or by an alkali metal salt, ammonium salt, alkaline earth metal salt, or bismuth salt of phosphomolybdic acid;

(3) One or more of the group aluminum phosphate, zirconium phosphate, calcium phosphate, magnesium phosphate, or titanium phosphate promoted by one or more of a sulfide of molybdenum or tungsten, or by an oxide or a compound convertible to an oxide by calcination of molybdenum, tungsten or rhenium or by magnesium tungstate or beryllium phosphotungstate;

(4) Silica, alumina, aluminum phosphate, zirconium phosphate, calcium phosphate, magnesium phosphate, or titanium phosphate promoted by a hexacarbonyl of molybdenum or tungsten; and (5) Homogeneous olefin reaction catalysts where appropriate. In such embodiments catalyst removal and/or recovery steps normally are required. For example, transition metal containing homogeneous catalyst systems, active for the disproportionation of olefins, can be used. An example of one such catalyst system is bis(triphenylphosphine)dinitrosyldichloromolybdenum and methylaluminum sesquichloride can be used at atmospheric room temperature and preferably in the presence of a reaction diluent. Some suitable homogeneous catalyst systems are disclosed and claimed in U.S. applications Ser. Nos. 635,708, 635,693 (now abandoned), 635,669 (now abandoned), 635,657 (now abandoned), 635,649 (now abandoned), filed May 3, 1967; 694,872 (now abandoned), 694,873 (now abandoned), 694,874, filed Jan. 2, 1968; and 696,109 (now abandoned), filed Jan. 8, 1968.

The catalysts of (1) can be prepared and activated by conventional techniques such as by combining a catalyst grade silica with a suitable tungsten, molybdenum, rhenium or tellurium, compound by a conventional method such as, for example, impregnation, dry mixing or coprecipitation. Suitable tungsten and molybdenum compounds include tungsten oxide and molybdenum oxide and compounds convertible to the oxide, tungsten sulfide and molybdenum sulfide. The supported oxides and compounds convertible to the oxide are activated by calcining in air, and the supported sulfides are activated by heating in an inert atmosphere.

The catalysts of (2) can be prepared and activated by conventional techniques such as by combining catalyst grade alumina with an oxide or compound convertible to an oxide by calcination of molybdenum, tungsten or rhenium and calcining the resulting mixture after removal of any solvent used in the impregnation. The sulfides of tungsten or molybdenum or the salts of phosphomolybdic acid can be utilized to impregnate a catalyst grade alumina by solution in a proper solvent after which the solvent is evaporated and the resulting mixture dried to prepare the catalyst.

The catalyst compositions of (3) can be prepared and activated by conventional techniques. For example, molybdenum oxide can be coprecipitated with aluminum phosphate, followed by calcination in air to produce an activated catalyst. Alternatively, the support material can be impregnated with a compound of the promoter convertible to the oxide, such as ammonium tungstate, followed by calcination in air. In the preparation of a sulfide-containing catalyst, a sulfide of the promoter can be ball milled with a support such as zirconium phosphate, followed by heating in an inert atmosphere such as nitrogen. Magnesium tungstate and beryllium phosphotungstate can be dry mixed with titanium phosphate, for example, an activated by calcination in air at elevated temperatures.

The catalyst compositions of (4) can be prepared and activated by impregnating a previously calcined support material such as calcium phosphate with a solution of the hexacarbonyl of the promoter in an organic solvent such as benzene, followed by drying in a vacuum or in an inert atmosphere at about 50 to 700° F.

The catalyst compositions of (5) can be prepared by simple combination of the transition metal compound with a suitable adjuvant such as, for example, an organo-aluminum halide, under conditions suitable to provide a catalyst active for the olefin reaction.

The solid catalytic agent is considered to be the reaction product resulting from the admixture of the support material and the promoter material and any subsequent activation treatment.

The operating temperature for the olefin reaction is generally in the range of about 0 to 1200° F. When using the catalysts of (1), it is in the range of about 400 to about 1100° F.; when using the catalysts of (2), in the range of about 150 to 500° F.; when using the catalysts of (3), in the range of about 600 to 1200° F.; when using the catalysts of (4), in the range of about 0 to 600° F.; when using the catalysts of (5), in the range of about −20 to 170° F. In the olefin reaction process, generally the pressure is not critical except with respect to the state of the materials in the reaction zone and with respect to conditions up and downstream from the reaction zone, but generally the pressure is in the range of 0 to 2000 p.s.i.g.

The solid catalysts of the olefin reaction can be in the form of a powder, or granules, as well as in other shapes such as agglomerates, pellets, spheres, extrudates, beads, and other forms depending upon the type of contacting technique utilized.

With a fixed bed reactor and continuous operation, weight hourly space velocity in the range of about 0.5 to 1000 parts by weight of hydrocarbon feed per part by weight of catalyst per hour (WHSV) are suitable, and excellent results have been obtained in the range of 1 to 200 WHSV.

It is frequently advantageous to associate double bond isomerization with the olefin reaction. This can be done by providing a combined catalyst system which contains both an olefin reaction catalyst and a double bond isomerization catalyst. In one such system, the olefin feed sequentially contacts an isomerization catalyst and an olefin reaction catalyst. In another such system, the feed contacts a compatible mixture of such catalysts. A convenient combined catalyst system of this type is a fixed bed system containing an intimate physical mixture of a particulate olefin reaction catalyst and a particulate isomerization catalyst. When air activated refractory oxide olefin reaction catalysts are used, metal oxide isomerization catalysts such as MgO, ZnO, etc., are particularly appropriate.

Depending upon the specific feed materials and the specific catalysts being used, any conventional contacting technique can be utilized, such as fixed bed reaction, fluidized bed reaction, liquid phase batch reaction, and the like.

At the completion of the reaction, the reaction mixture can be processed to recover any desired product by any conventional means such as fractionation, crystallization, adsorption, and the like. Unreacted material or products not in the desired molecular weight range can be recycled.

Figure 1:
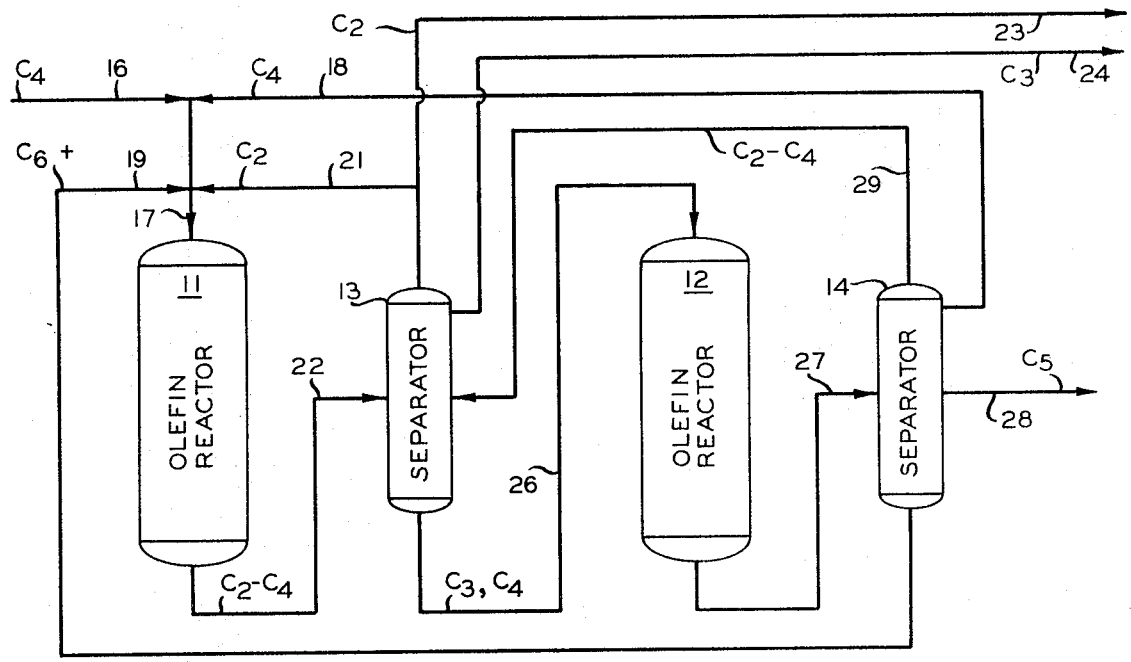
FIG. 1 is a schematic representation of an embodiment of the invention utilizing two olefin reactors.

In the invention, as illustrated in FIG. 1, the mixed butene stream is contacted with an olefin disproportionation catalyst, such as a silica-supported tungsten oxide catalyst, in intimate admixture with an olefin double bond isomerization catalyst such as magnesium oxide. The silica-supported tungsten oxide and magnesium oxide system is a preferred catalyst system, although any compatible mixture of an olefin isomerization catalyst and an olefin disproportionation catalyst can be used. Before contact with the mixed bed catalyst, the mixed butene stream is blended with ethylene, obtained from a subsequent unit, the proportions usually ranging from about 1 to about 20, preferably 2 to about 10 mols of ethylene per mol of n-butene. The effluent from this first catalytic olefin reaction unit contains isobutene, propylene, ethylene, and possibly some small amounts of unconverted n-butenes.

After separation of the effluent from the first catalytic unit, a stream containing isobutene and propylene, containing at least about 50 mol percent isobutene, is conducted to a second catalytic unit containing an olefin disproportionation catalyst such as the silica-supported tungsten oxide, under conditions to produce isoamylenes. The isoamylenes are separated and recovered from the effluent in a subsequent separation stage and the ethylene, propylene, and isobutene, recycled to the appropriate catalytic unit. The ethylene produced in this unit will approximately equal the ethylene consumed in the first unit. The relatively small amounts of hexene and heavier olefins also are recycled to the first olefin reaction unit.

In FIG. 1 there is a first olefin reactor 11 and a second olefin reactor 12. First and second separation zones 13 and 14 are connected as shown.

The mixed butene feed stream enters through pipe 16 and passes through pipe 17 into reactor 11. Additional mixed butenes are recycled through pipe 18 and $C_6$ and heavier hydrocarbons are fed through pipe 19 and ethylene through pipe 21. The effluent from reactor 11, reduced in n-butene content and enriched in propylene content is passed through pipe 22 into separator 13. Ethylene is recycled through pipe 21 and any excess ethylene is removed through pipe 23. The butenes, together with the major portion of the propylene, are passed through pipe 26 into second olefin reactor 12. The effluent from reactor 12, containing isoamylene, together with produced ethylene and unconverted propylene and butenes, as well as a small amount of $C_6$ and heavier hydrocarbons, is passed into separator 14 through pipe 27. Amylenes are produced as a product from separator 14 through pipe 28. Ethylene, propylene and the major portion of the butenes from separator 14 are passed through pipe 29 back into separator 13. A smaller amount of butenes, containing substantially all of the n-butenes, are returned through pipe 18 to reactor 11. $C_6$ and heavier hydrocarbons are returned to reactor 11 through pipe 19.

EXAMPLE I

In an example according to the invention as illustrated in FIG. 1, the olefin reactor 11 contains a combined olefin reaction and double bond isomerization catalyst comprising silica-supported tungsten oxide as the olefin reaction catalyst and magnesium oxide as the isomerization catalyst in a ratio of 4 parts by weight of magnesium oxide to one part by weight of the silica-supported tungsten oxide. This reactor is maintained at 750° F. and 300 p.s.i.g. and the reactants are passed into the reactor at the rate of 20 parts by weight of reactant per part by weight of total catalyst per hour (20 WHSV). In reactor 12 the catalyst is a silica-supported tungsten oxide and the temperature is 800° F., the pressure 300 p.s.i.g. and the reactants are passed into the reactor at the rate of 100 WHSV. The various amounts of the hydrocarbons in the various streams are set forth in the table below, the amounts shown being sufficient for a plant producing 68,000 tons per year of isoamylenes. The amounts in the table are shown in mols per hour.

and no separate isomerization step is required to convert butene-1 to butene-2. The present invention is capable therefore of producing isoamylene or purities approaching 100 percent and in yields near 1.20 pounds of isoamylene per pound of isobutene.

The precise operating conditions for each of the catalytic units will depend upon the specific catalyst utilized. The separation steps of the process are of course greatly simplified in the drawings and examples and can, in actual operation, represent either a greater or a smaller number of separation means such as fractionation, adsorption, and the like. Any convenient sequence of separation steps can be used. Conventional features such as pumps, heat exchangers, valves, heaters, and the like have been omitted from the description of the invention for simplicity.

By-product materials other than propylene are relatively insignificant. However, a small amount of paraffin materials can be formed and these can be removed at any convenient point in the process, together with any paraffinic materials included in the feedstock. It is also sometimes advantageous to feed to the olefin reaction zones feed streams which have been deoiled, that is, which have had any materials heavier than the feed removed, for example, by distillation. In this way the accumulation or

TABLE

| Mols/hour | 16 | 22 | 26 | 27 | 28 | 21 | 23 | 24 | 29 | 18 |
|---|---|---|---|---|---|---|---|---|---|---|
| $C_2=$ | | 2,190 | | 320 | | 2,500 | 10 | | 320 | |
| $C_3=$ | | 534 | 940 | 457 | | | | 47 | 457 | |
| $i-C_4=$ | 192 | 298 | 1,100 | 855 | | | | | 802 | 53 |
| $n-C_4=$ | 152 | 10 | 10 | 92 | | | | | | 92 |
| $i-C_5=$ | | | | 240 | 240 | | | | | |
| $n-C_5=$ | | | | 1 | 1 | | | | | |
| $C_6+$ | | | | 44 | | | | | | 44 |
| Total | 344 | 3,033 | 2,051 | 2,009 | 241 | 2,500 | 10 | 47 | 1,579 | 145 | 44 |

Figure 2:
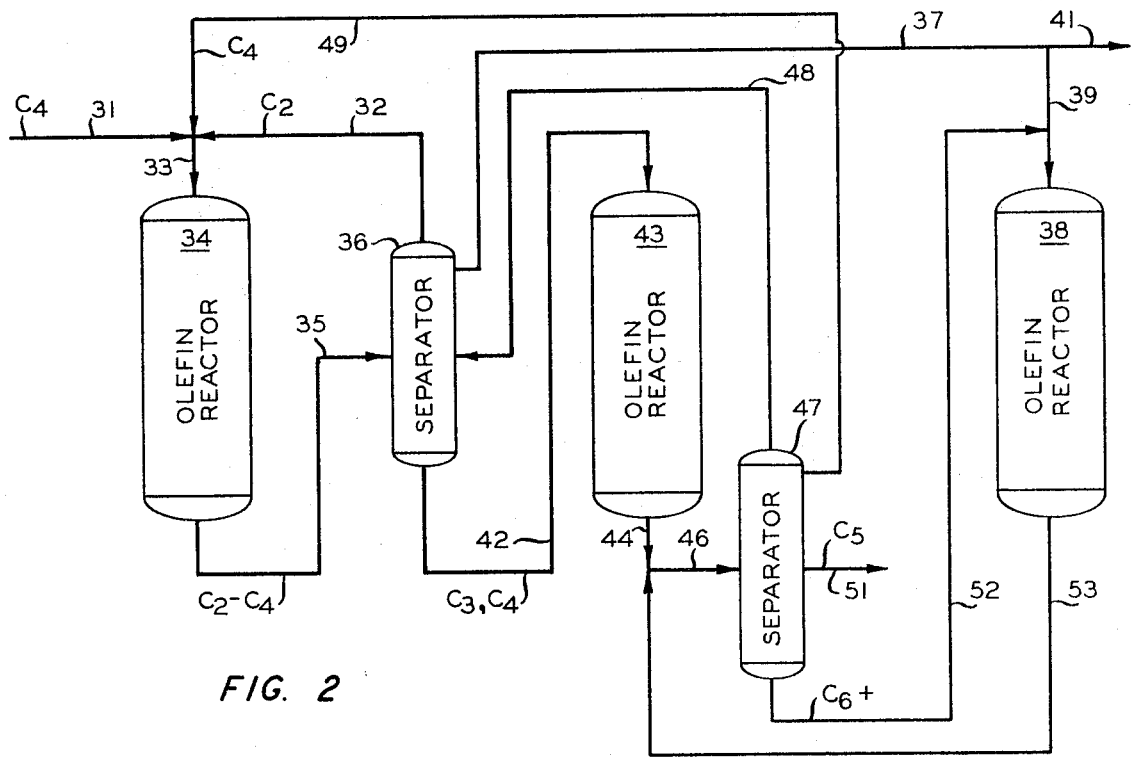
FIG. 2 is a schematic representation of an embodiment of the invention utilizing three olefin reactors.

In the invention as illustrated in FIG. 2, an additional olefin reaction zone is provided. In this embodiment, the hexenes and heavier olefin by-products, instead of being recycled to the first olefin reaction zone, are conducted to the third olefin reaction zone and reacted therein with propylene to produce lower molecular weight reusable olefins. Preferably an excess of propylene is provided in this zone. The effluent from this unit contains isoamylenes, ethylene and unconverted heavier olefins and propylene. These are recycled to the appropriate place in the process.

In the operation of the invention as illustrated in FIG. 2, the $C_4$ feed stream is passed into the system through pipe 31 and combined with recycled $C_4$'s in pipe 49 and fed through pipe 33 into olefin reactor 34. The effluent, containing additional propylene and reduced n-butene content, is passed through pipe 35 into separator 36. Ethylene from separator 36 is returned through pipe 32 to olefin reactor 34. Propylene is removed through pipe 37 and fed into olefin reactor 38 through pipe 39 or removed from the system through pipe 41. Propylene and butenes are passed through pipe 42 into olefin reactor 43. The effluent from reactor 43, containing product isoamylene, is passed through pipe 44 and pipe 46 into separator 47. A stream comprising ethylene and propylene is returned to separator 36 through pipe 48. $C_4$ hydrocarbons are recycled through pipe 49 to olefin reactor 34. $C_5$ olefins are recovered as a product stream through pipe 51. $C_6$ and heavier olefins are passed through pipe 52 into olefin reactor 38. The effluent from olefin reactor 38 is returned through pipe 53 to separator 47.

In the practice of the invention the major portion of the isoamylene product is produced in an olefin reaction zone in which isobutene is reacted with propylene in the substantial absence of n-butenes. Thus the isoamylene product is contaminated with little or no n-amylene by-products which must be separated from the isoamylene. Further, because of the essential absence of butene-1 at this stage, little if any isohexene is formed as a by-product carry-over of small amounts of materials which may poison or shorten the life of the catalyst is avoided.

That which is claimed is:

1. A process for converting mixed butenes to isoamylenes, comprising the steps of:

passing a first stream comprising mixed butenes and ethylene into a first olefin reaction zone;

converting said first stream according to the olefin reaction which, as defined herein, can be visualized as comprising the reaction between two first pairs of carbon atoms, the two carbon atoms of each first pair being connected by an olefinic double bond, to form two new pairs from the carbon atoms of said first pairs, the two carbon atoms of each of said new pairs being connected by an olefinic double bond, in said first olefin reaction zone to produce an effluent stream enriched in propylene and having reduced amounts of n-butenes;

separating the effluent from said olefin reaction zone to produce a second stream comprising ethylene and a third stream comprising propylene and isobutylene;

passing said third stream comprising propylene and isobutylene from the effluent of said first olefin reaction zone into a second olefin reaction zone;

converting said third stream in said second olefin reaction zone to produce a product stream comprising isoamylene; and recycling said second stream to said first olefin reaction zone.

2. The process of claim 1 wherein $C_4$ and $C_6$ and heavier olefins in the product stream are separated and recycled to said first olefin reaction zone.

3. The process of claim 1 wherein propylene in the effluent from said first olefin reaction zone and $C_6$ and heavier hydrocarbons in said product stream are separated and passed into a third olefin reaction zone and reacted therein to produce at least one olefin product having not more than 5 carbon atoms per molecule.

4. The process of claim 2 wherein said effluent stream is separated in a first separation zone to produce said second stream comprising ethylene which is returned to said first olefin reaction zone, said third stream comprising isobutene and propylene which is passed to said second olefin reaction zone, and a fourth stream comprising propylene; and wherein said product stream is passed into a second separation zone to produce a fifth stream comprising ethylene, propylene and isobutylene which is recycled to said first separation zone, a sixth stream comprising $C_6$ and heavier olefins which is recycled to said first olefin reaction zone and a seventh stream comprising isoamylene.

5. The process of claim 3 wherein said effluent stream from said first olefin reaction zone is passed into a first separation zone and separated therein to produce said second stream comprising ethylene which is recycled to said first olefin reaction zone, said third separated stream comprising propylene and isobutylene which is passed into said second olefin reaction zone, and a fourth stream comprising propylene which is passed into said third olefin reaction zone; and wherein the effluent stream from said second olefin reaction zone and the effluent from said third olefin reaction zone are passed into a second separation zone and separated therein to produce a fifth stream comprising ethylene, propylene and isobutylene which is returned to said first separation zone, a sixth stream comprising $C_6$ and heavier olefins which is passed into said third olefin reaction zone and a seventh stream comprising isoamylene product.

6. The process of claim 1 wherein said first olefin reaction zone is a combined olefin reaction and double bond isomerization zone.

7. The process of claim 1 wherein a tungsten oxide on silica plus magnesia catalyst is used in the first olefin reaction zone and a tungsten oxide on silica catalyst is used in said second olefin reaction zone.

8. The process of claim 2 wherein said first olefin reaction zone is a combined olefin reaction and double bond isomerization zone.

9. The process of claim 2 wherein a combined magnesium oxide and tungsten oxide on silica catalyst is used in said first olefin reaction zone and a tungsten oxide on silica catalyst is used in said second and said third olefin reaction zones.

References Cited

UNITED STATES PATENTS

| | | | |
|---|---|---|---|
| 3,261,879 | 7/1966 | Banks | 260—683 |
| 3,365,513 | 1/1967 | Heckelsberg | 260—683 |
| 3,457,320 | 7/1969 | Stapp et al. | 260—683 |

OTHER REFERENCES

Bradshaw et al.: Olefin Dismutation, Journal of Catalysis, vol. 7, page 276 (1967).

DELBERT E. GANTZ, Primary Examiner

C. E. SPRESSER, JR., Assistant Examiner